(12) United States Patent
Weng et al.

(10) Patent No.: US 11,340,485 B2
(45) Date of Patent: May 24, 2022

(54) LIQUID CRYSTAL DISPLAY DEVICE HAVING FINGERPRINT MODULE

(71) Applicant: HON HAI PRECISION INDUSTRY CO., LTD., New Taipei (TW)

(72) Inventors: Yu-Fu Weng, New Taipei (TW); Hung-Yun Huang, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 83 days.

(21) Appl. No.: 16/695,583

(22) Filed: Nov. 26, 2019

(65) Prior Publication Data

US 2020/0183211 A1 Jun. 11, 2020

Related U.S. Application Data

(60) Provisional application No. 62/776,475, filed on Dec. 7, 2018.

(51) Int. Cl.
*G02F 1/1333* (2006.01)
*G02F 1/13357* (2006.01)
*G06V 40/13* (2022.01)
*G02F 1/1335* (2006.01)

(52) U.S. Cl.
CPC .... *G02F 1/13338* (2013.01); *G02F 1/133603* (2013.01); *G02F 1/133605* (2013.01); *G02F 1/133606* (2013.01); *G06V 40/1318* (2022.01); *G02F 1/133607* (2021.01)

(58) Field of Classification Search
CPC .......... G02F 1/13338; G02F 1/133603; G02F 1/133605; G02F 1/133606; G02F 1/133607; G06K 9/0004; G06V 40/1318
USPC .......................................................... 349/12
See application file for complete search history.

(56) References Cited

U.S. PATENT DOCUMENTS

| | | | |
|---|---|---|---|
| 2018/0314096 A1 | 11/2018 | Yang et al. | |
| 2019/0310724 A1* | 10/2019 | Yeke Yazdandoost | G02F 1/13338 |
| 2020/0081295 A1* | 3/2020 | Oh | H05K 1/147 |

FOREIGN PATENT DOCUMENTS

TW 201839656 A 11/2018

* cited by examiner

*Primary Examiner* — Charles S Chang
(74) *Attorney, Agent, or Firm* — ScienBiziP, P.C.

(57) ABSTRACT

An LCD device defining a display area includes a backlight module for providing light, an LCD panel stacked on the backlight module, and a fingerprint sensor in the backlight module. The fingerprint sensor is positioned in the display area and defines a fingerprint sensing area in the display area.

7 Claims, 10 Drawing Sheets

LIQUID CRYSTAL DISPLAY DEVICE HAVING FINGERPRINT MODULE

FIELD

The subject matter herein generally relates to a liquid crystal display (LCD) device, particularly relates to an LCD device having a fingerprint sensor.

BACKGROUND

In a conventional LCD device, such as a mobile phone, a transparent cover and a fingerprint sensor are combined on an LCD panel. The fingerprint sensor is generally opaque and located in a non-display area of the LCD device, which limits a screen ratio of the LCD device.

BRIEF DESCRIPTION OF THE DRAWINGS

Implementations of the present technology will now be described, by way of embodiments only, with reference to the attached figures.

DETAILED DESCRIPTION

Figure 1:
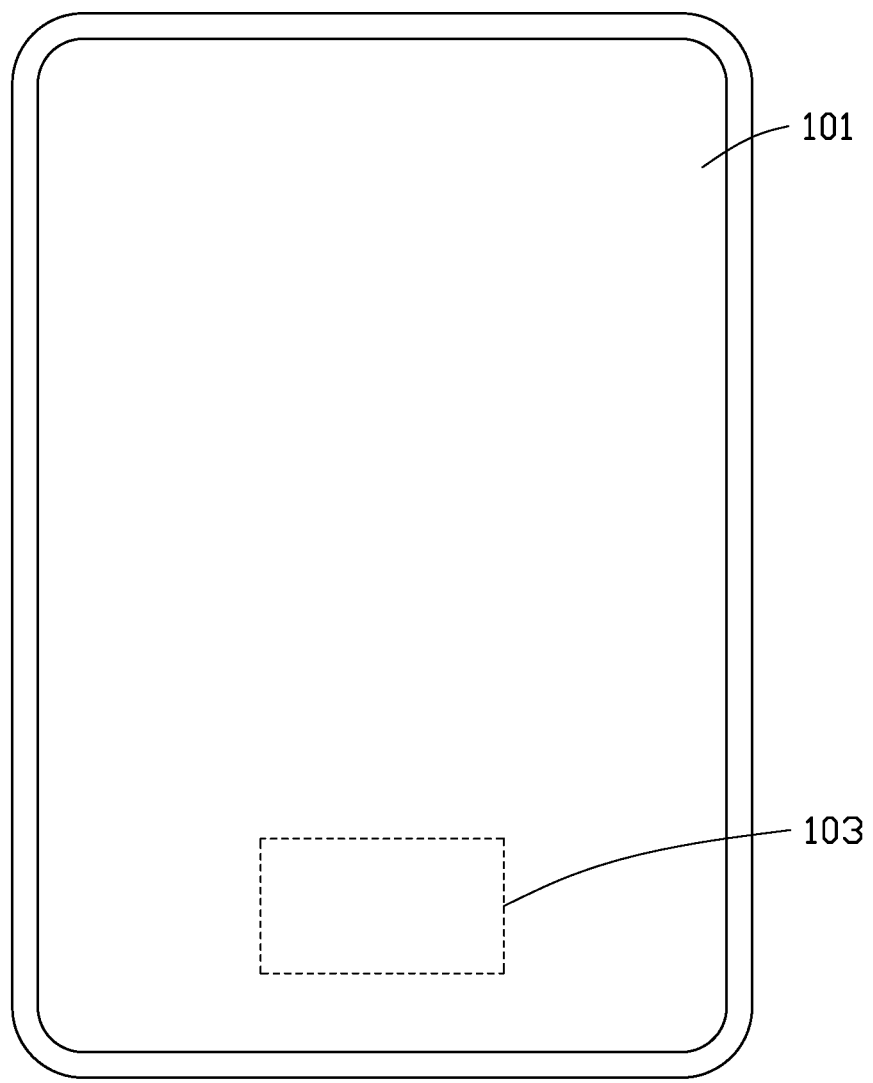
FIG. 1 is a bottom view of an LCD device in accordance with a first embodiment, a second embodiment, and a fifth embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

First Embodiment

FIG. 1 illustrates an LCD device 100 according to an embodiment. The LCD device 100 defines a display area 101. A fingerprint sensing area 103 is defined in the display area 101. In this embodiment, the LCD device 100 is a mobile phone.

Figure 2:
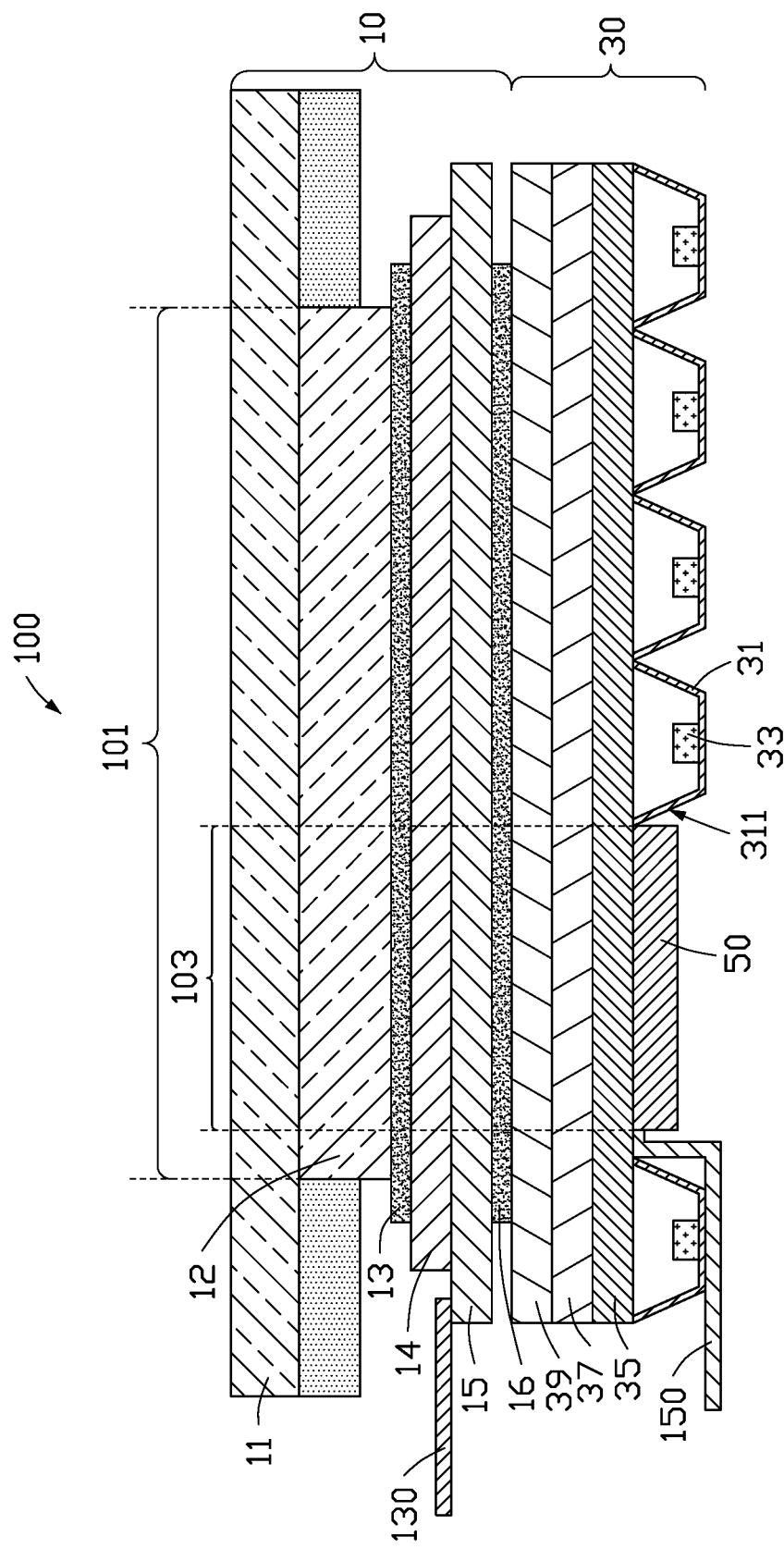
FIG. 2 is a cross-sectional view of the LCD device in accordance with the first embodiment.

As shown in FIG. 2, the LCD device 100 includes a backlight module 30, a display panel 10 stacked on the backlight module 30, and a fingerprint sensor 50 in the backlight module 30. The backlight module 30 emits light to the display panel 10. The display panel 10 displays images by using light from the backlight module 30. The fingerprint sensor 50 is used for fingerprint recognition. Since the fingerprint sensor 50 is in the backlight module 30 under the display panel 10, the fingerprint sensor 50 does not interfere with the display panel 10. The fingerprint sensing area 103 does not affect the display area 101, and the fingerprint sensing area 103 can both display images and identify fingerprints. Thus, in this embodiment, there is no requirement for the fingerprint sensor 50 to be transparent.

In this embodiment, the backlight module 30 is a conventional direct-type backlight module and includes a reflective sheet 31, a plurality of light-emitting diodes (LEDs) 33 on a side of the reflective sheet 31, and a diffusion sheet 35 on a light emitting side of the LEDs 33. A receiving hole 311 is defined in the backlight module 30 for mounting the fingerprint sensor 50. The receiving hole 311 is aligned with the fingerprint sensing area 103. An opening aligning with the fingerprint sensing area 103 is defined in the reflective sheet 31 and forms the receiving hole 311. The receiving hole 311 extends through the reflective sheet 31. There is no LED 33 positioned in the receiving hole 311.

In this embodiment, since the receiving hole 311 is formed in the backlight module 30, and no LED is positioned in the receiving hole 311, a light intensity of a region of the backlight module 30 having the receiving hole 311 may be different from a light intensity of other regions of the backlight module 30. In order to achieve a uniform light intensity, at least one optical component is provided and positioned on a side of the diffusion sheet 35 away from the LEDs 33. In this embodiment, the at least one optical component includes a diffusion film 37 and a prism sheet 39 on the side of the diffusion sheet 35 away from the LEDs 33, wherein the diffusion film 37 is adjacent to the diffusion sheet 35.

The display panel 10 is a conventional display panel. As shown in FIG. 2, the display panel 10 includes a transparent cover 11, an optical transparent adhesive 12, an upper polarizer 13, a color filter substrate 14, and a liquid crystal layer (not shown), a TFT substrate 15, and a lower polarizer 16, stacked in the order written.

Figure 10:
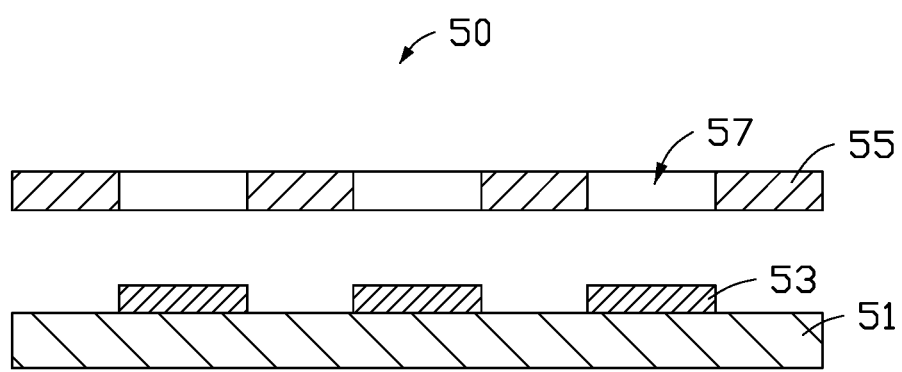
FIG. 10 is a cross-sectional view of a fingerprint sensor.

In this embodiment, the fingerprint sensor 50 is a common fingerprint sensor, such as an optical fingerprint sensor, as shown in FIG. 10. The optical fingerprint sensor includes a substrate 51 and CMOS photosensitive components 53 on the substrate 51, and a collimating filter layer 55. The collimating filter layer 55 defines a plurality of through holes 57 for allowing light reflected by the fingers to pass through, thus the light reflected by the fingers can reach the CMOS photosensitive components 53.

As shown in FIG. 2, the TFT substrate 15 is electrically connected to a display driving circuit 130, and the fingerprint sensor 50 is electrically connected to a circuit board 150. In this embodiment, the circuit board 150 is a flexible circuit board, and a fingerprint sensing circuit can be positioned on the flexible circuit board. As shown in FIG. 2, the flexible circuit board 150 connected to the fingerprint sensor 50 bends and extends along a side of the reflective sheet 31 away from the diffusion sheet 35, so that the opaque flexible circuit board 150 does not block light from the LEDs 33. It can be understood that the display driving circuit 130 can also be positioned on a flexible circuit board.

Figure 3:
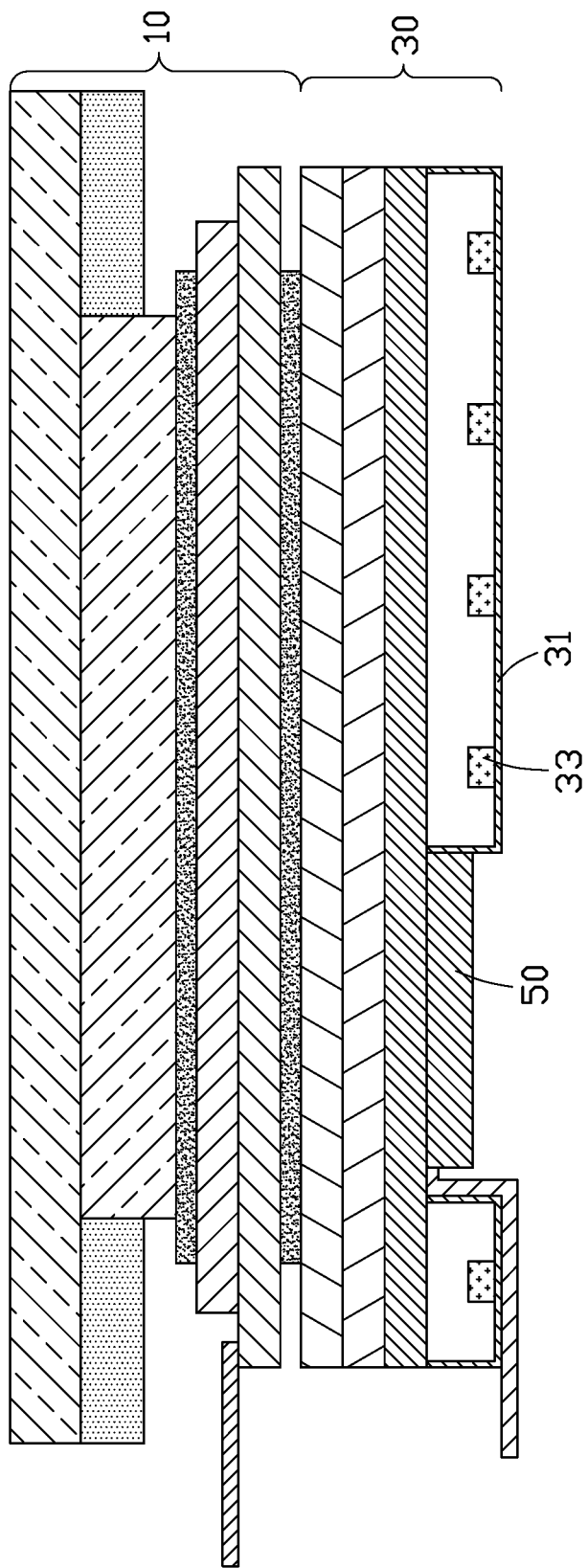
FIG. 3 is a cross-sectional view of an LCD device in accordance with a modified first embodiment.

The reflective sheet 31 shown in FIG. 2 is not plate-shaped. FIG. 3 shows the reflective sheet 31 having an overall flat shape.

Second Embodiment

Figure 4:
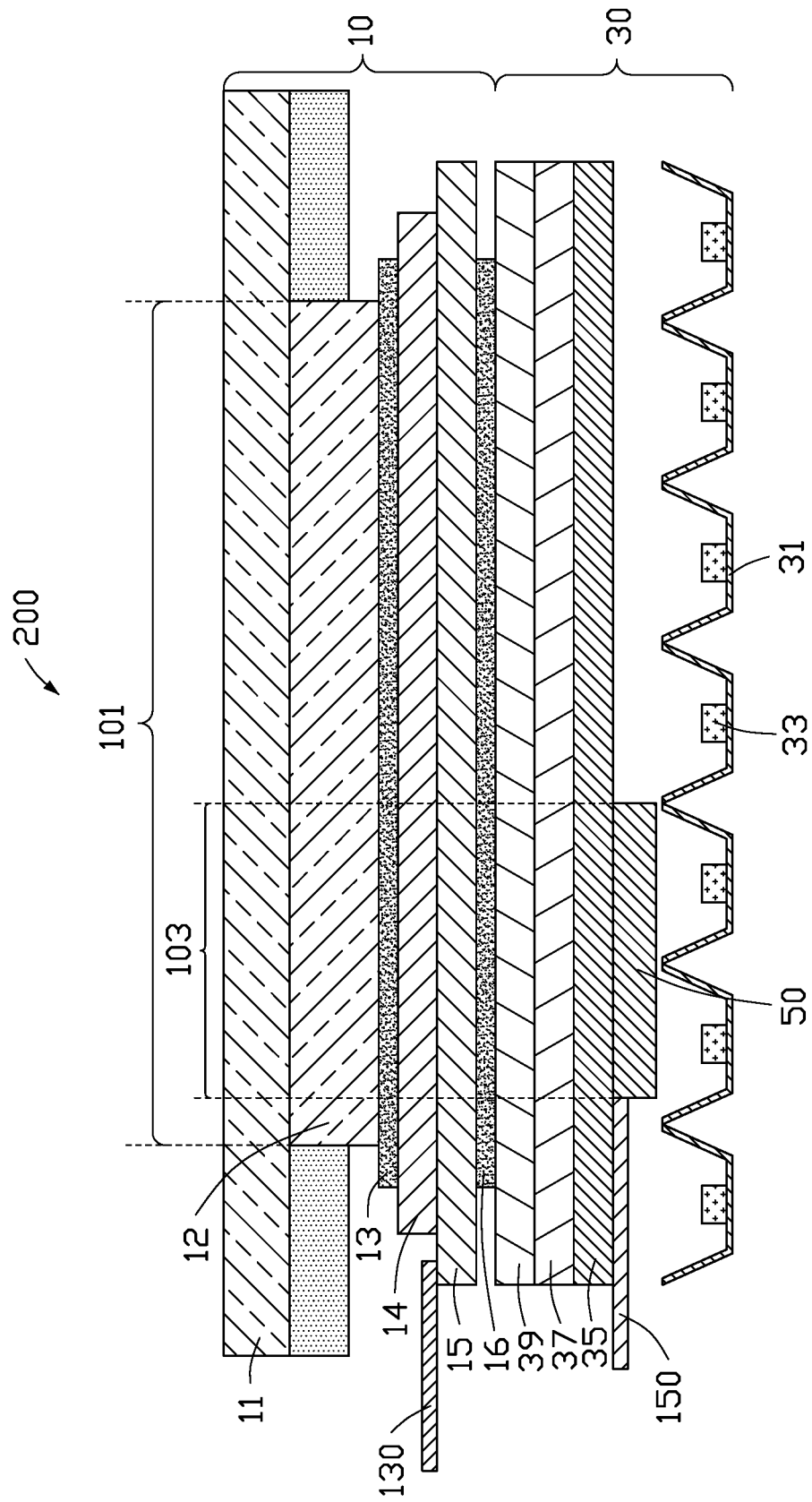
FIG. 4 is a cross-sectional view of the LCD device in accordance with the second embodiment.

Referring to FIG. 1 and FIG. 4, an LCD device 200 of the second embodiment is substantially the same as the LCD device 100 of the first embodiment, and includes a display panel 10, a backlight module 30 stacked under the display panel 10, and a fingerprint sensor 50 in the backlight module 30.

Differences between the LCD devices 100 and 200 is that the fingerprint sensor 50 of the LCD device 200 is at least translucent, and may be transparent. In the second embodiment, the backlight module 30 defines no receiving hole for mounting the fingerprint sensor 50 and the fingerprint sensor 50 is positioned between the diffusion sheet 35 and the LEDs 33, as shown in FIG. 4.

A side of the diffusion sheet 35 away from the LED 33 is further provided with the optical component to improve light uniformity. As shown in FIG. 4, a diffusion film 37 is provided and positioned on a side of the diffusion sheet 35 away from the LEDs 33.

In order to render the fingerprint sensor 50 altogether transparent or at least translucent, the components constituting the fingerprint sensor 50 also need to be transparent or translucent, for example, a transparent substrate and at least translucent CMOS photosensitive components 53.

As shown in FIG. 4, the TFT substrate 15 is electrically connected to a display driving circuit 130, and the fingerprint sensor 50 is electrically connected to a circuit board 150. In this embodiment, a fingerprint sensing circuit can be positioned on the circuit board 150. As shown in FIG. 4, the circuit board 150 is between the diffusion sheet 35 and the LEDs 33. To prevent the circuit board 150 from blocking light of the LEDs 33, the circuit board 150 connected to the fingerprint sensor 50 needs to be transparent or translucent. Further, the diffusing film 37 on the side of the diffusion sheet 35 away from the LEDs 33 creates uniform light from the backlight module 30.

Third Embodiment

Figure 5:
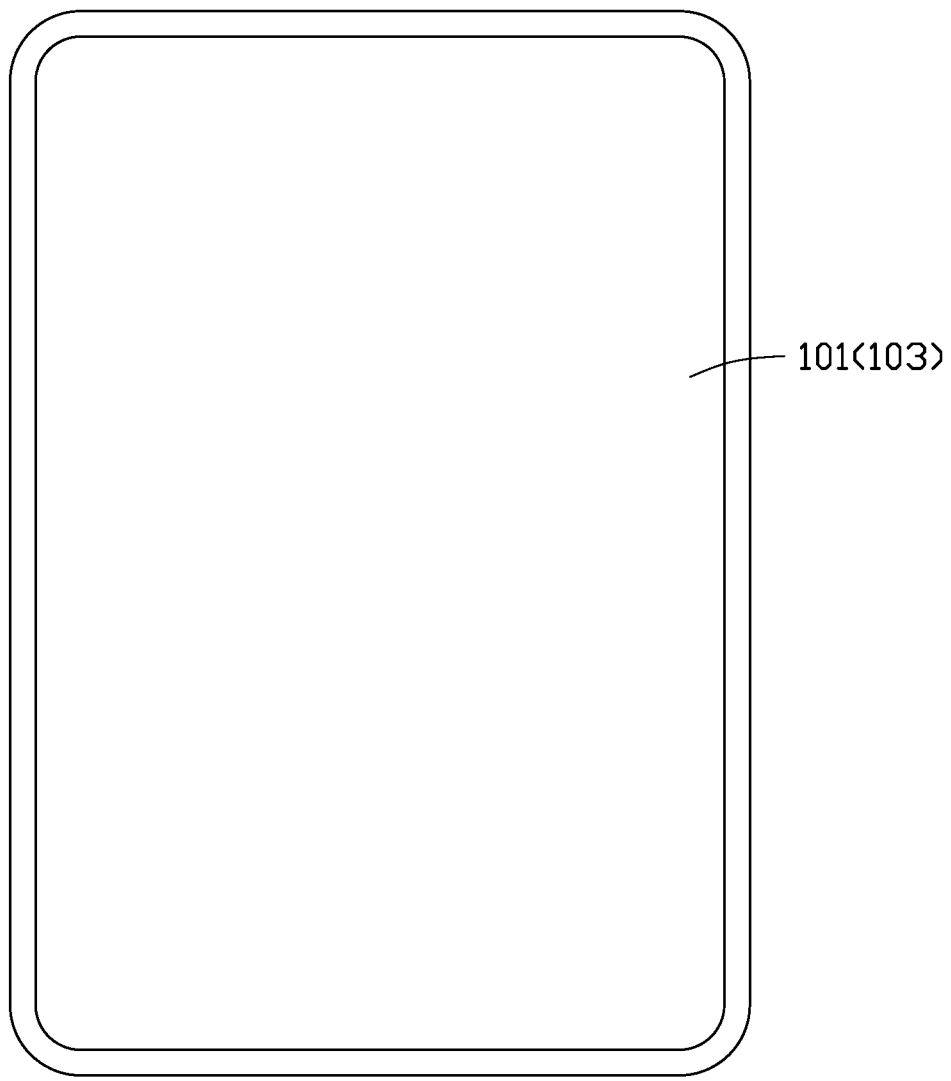
FIG. 5 is a bottom view of an LCD device in accordance with a third embodiment.

Referring to FIG. 5, an LCD device 300 of the third embodiment defines a display area 101. The display area 101 is also a fingerprint sensing area 103. A size of the display area 101 substantially the same as a size of the fingerprint sensing area 103 that is, the LCD device 300 can support full-screen fingerprint recognition.

Figure 6:
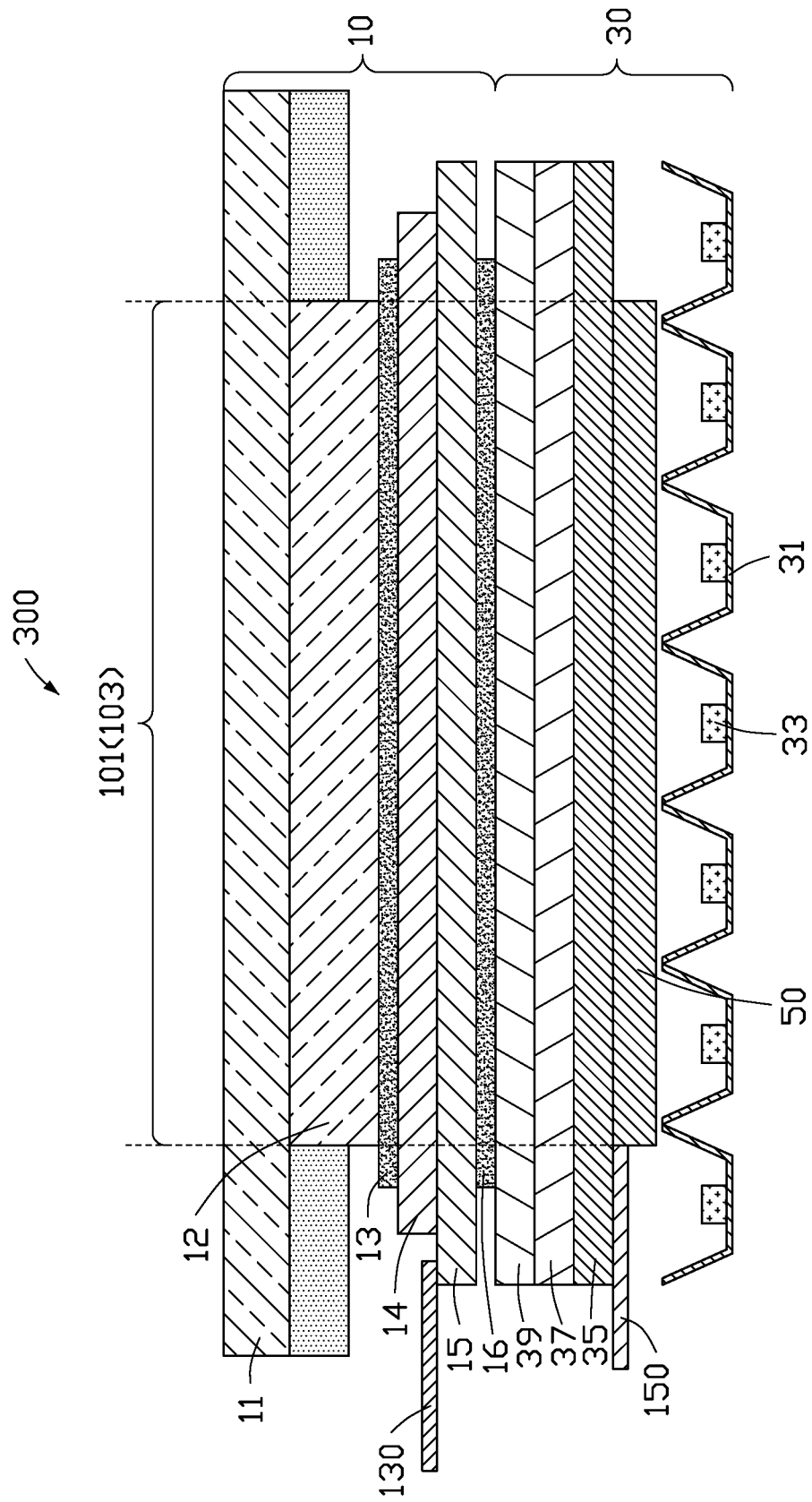
FIG. 6 is a cross-sectional view of the LCD device in accordance with the third embodiment.

The LCD device 300 of the third embodiment is substantially the same as the LCD device 100 of the first embodiment, and includes a display panel 10, a backlight module 30 stacked with the display panel 10, and a fingerprint sensor 50 in the backlight module 30, as shown in FIG. 6.

Differences between the LCD devices 100 and 300 are that the fingerprint sensor 50 of the LCD device 300 is at least translucent, such as transparent or translucent; the backlight module 30 defines no receiving hole for mounting the fingerprint sensor 50; and the fingerprint sensor 50 is positioned between the diffusion sheet 35 and the LEDs 33, the fingerprint sensor 50 is positioned on a light-emitting side of the LEDs 33, as shown in FIG. 6.

In this embodiment, since the fingerprint sensor 50 is full size and occupies almost an entire area of the backlight module 30, the fingerprint sensor 50 has same influence on the light intensity of each area of the backlight module 30, and the backlight module 30 has uniform light intensity. It is also possible to make the light of the backlight module 30 uniform by providing a diffusion film 37 on a side of the diffusion sheet 35 away from the LEDs 33.

As shown in FIG. 6, the TFT substrate 15 is electrically connected to a display driving circuit 130, and the fingerprint sensor 50 is electrically connected to a circuit board 150. The circuit board 150 is positioned in the non-display area without any interference to the display panel 10.

Fourth Embodiment

Figure 7:
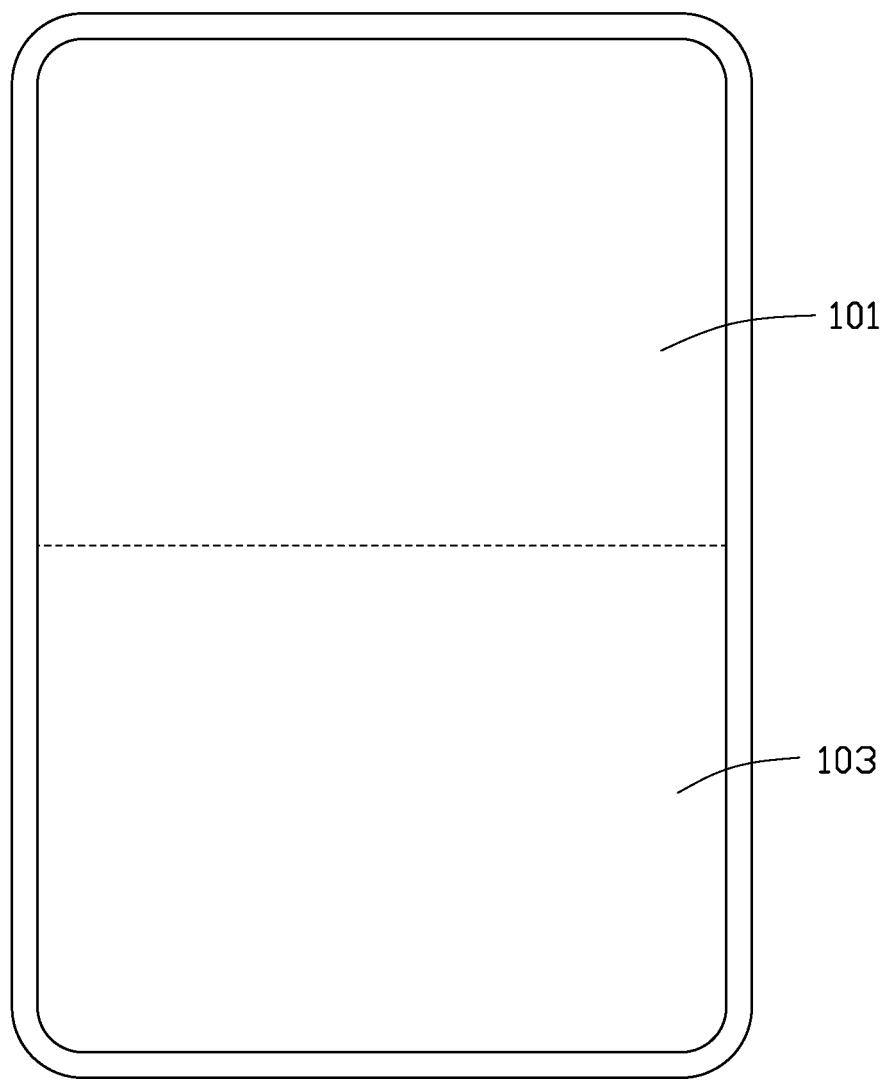
FIG. 7 is a bottom view of an LCD device in accordance with a fourth embodiment.

Referring to FIG. 7, an LCD device 400 of the fourth embodiment defines a display area 101. A fingerprint sensing area 103 is defined in the display area 101, in a portion of the display area 101. A size of the fingerprint sensing area 103 is substantially half of a size of the display area 101, the LCD device 400 can support half-screen fingerprint recognition.

Figure 8:
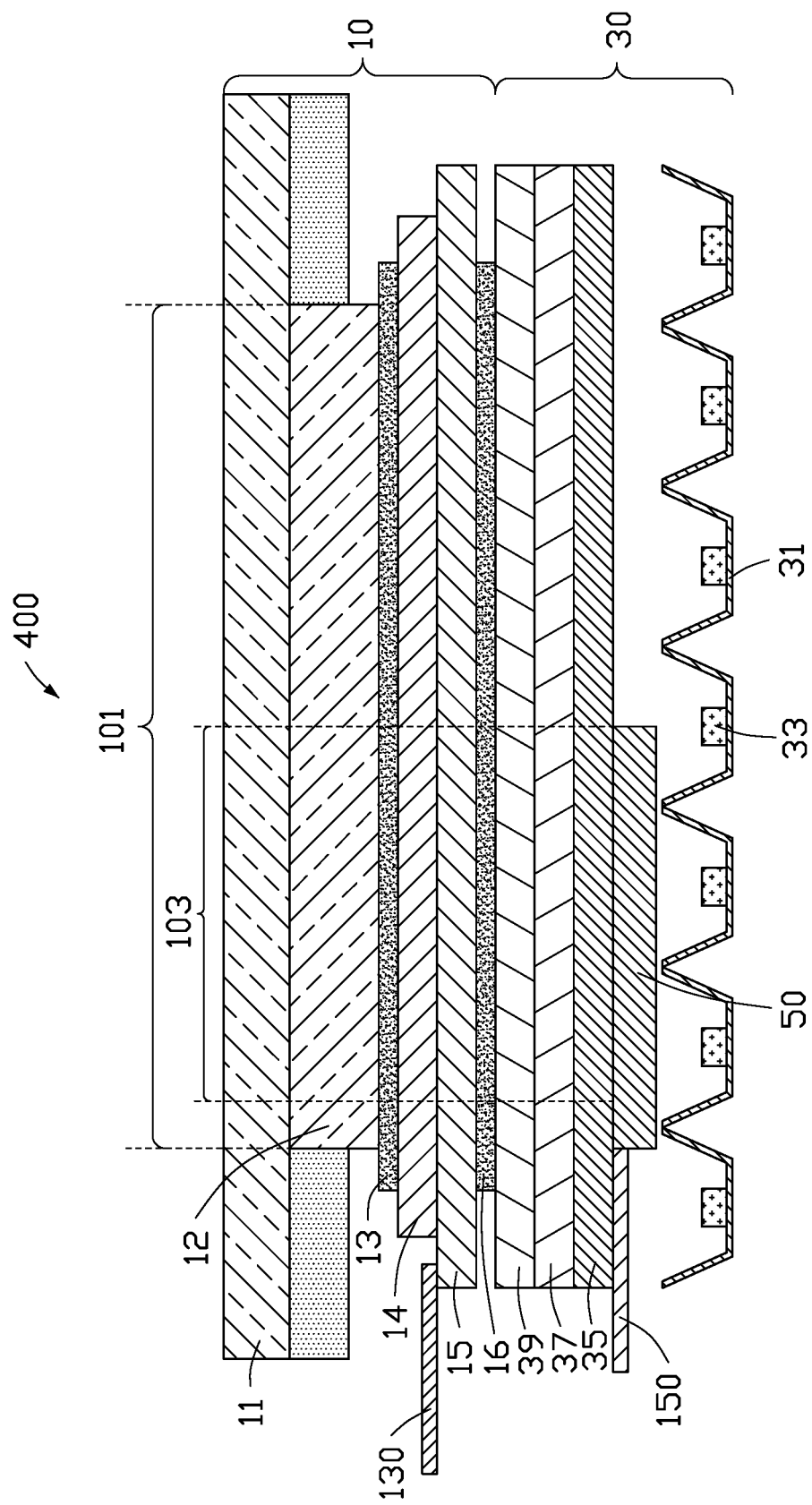
FIG. 8 is a cross-sectional view of the LCD device in accordance with the fourth embodiment.

The LCD device 400 of the fourth embodiment is substantially the same as the LCD device 100 of the first embodiment, and includes a display panel 10, a backlight module 30 stacked with the display panel 10, and a fingerprint sensor 50 in the backlight module 30, as shown in FIG. 8.

Differences between the LCD devices 100 and 400 is that the fingerprint sensor 50 of the LCD device 400 is at least translucent, such as transparent or translucent; the backlight module 30 defines no receiving hole for mounting the fingerprint sensor 50; and the fingerprint sensor 50 is positioned between the diffusion sheet 35 and the LEDs 33, as shown in FIG. 8.

As shown in FIG. 8, the TFT substrate 15 is electrically connected to a display driving circuit 130, and the fingerprint sensor 50 is electrically connected to a circuit board 150. The circuit board 150 is positioned in the non-display area without any interference with the display.

Fifth Embodiment

Figure 9:
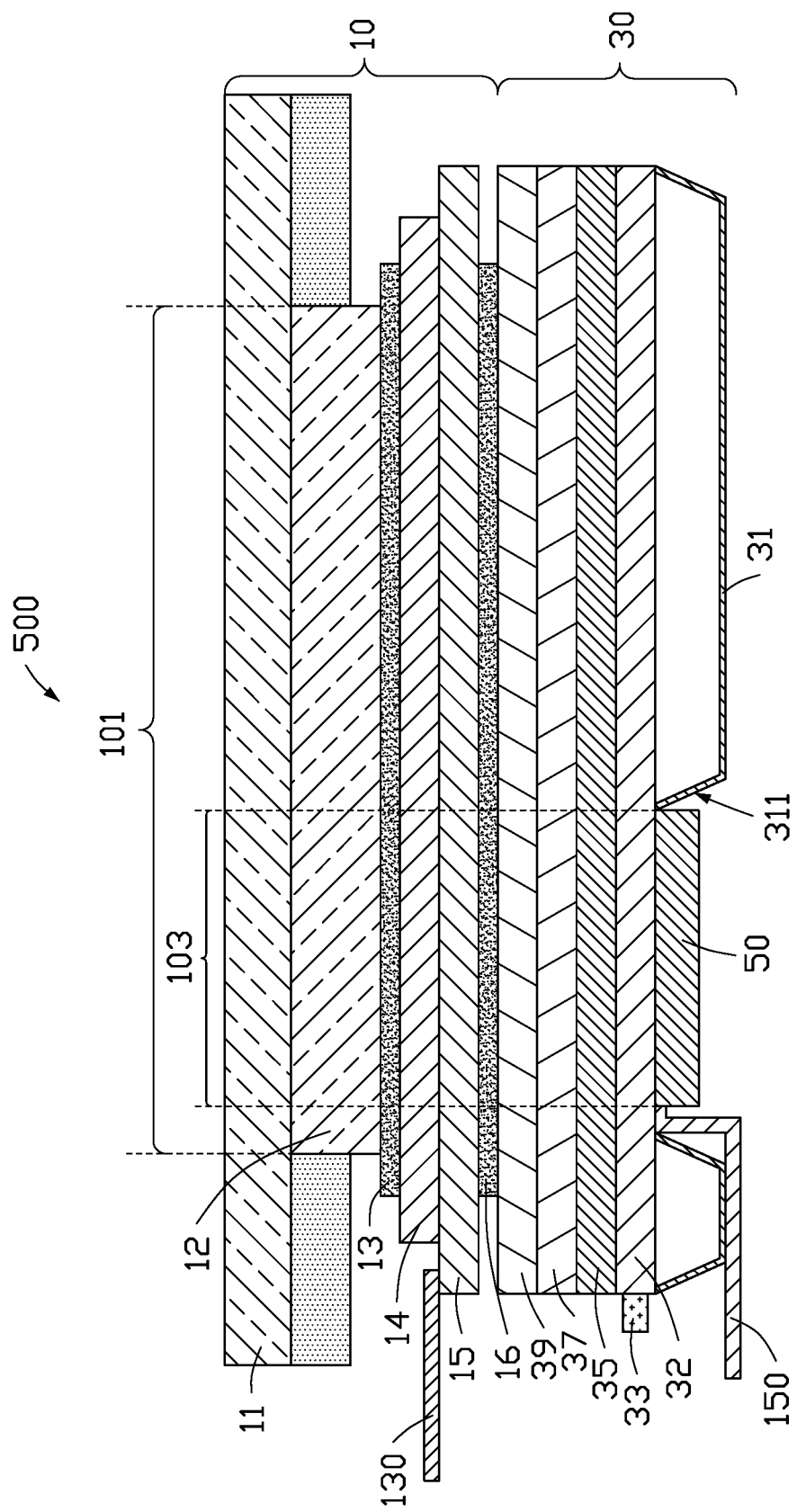
FIG. 9 is a cross-sectional view of an LCD device in accordance with a fifth embodiment.

Referring to FIG. 1 and FIG. 9, an LCD device 500 of the fifth embodiment is substantially the same as the LCD device 100 of the first embodiment, and includes a display panel 10, a backlight module 30 stacked with the display panel 10, and a fingerprint sensor 50 in the backlight module 30. The backlight module 30 defines a receiving hole 311 for mounting the fingerprint sensor 50

Differences between the LCD devices 100 and 500 is that the backlight module 30 of the LCD device 500 is a side-entry backlight module and includes a reflective sheet 31, a light guide plate 32 stacked on the reflective sheet 31, and LEDs 33 on a side of the light guide plate 32. In this embodiment, the receiving hole 311 extends through the reflective sheet 31, and the fingerprint sensor 50 is received in the receiving hole 311 and is in contact with the light guide plate 32.

The fingerprint sensor 50 is at least translucent, such as transparent or translucent; the backlight module 30 defines no receiving hole for mounting the fingerprint sensor 50; and the fingerprint sensor 50 is positioned between the diffusion sheet 35 and the LEDs 33, as shown in FIG. 9.

As shown in FIG. 9, the fingerprint sensor 50 is electrically connected to a circuit board 150. In this embodiment, the circuit board 150 is flexible and a fingerprint sensing circuit can be positioned on the circuit board 150. The flexible circuit board 150 bends and extends along a side of the reflective sheet 31 away from the diffusion sheet 35, so that the opaque flexible circuit board 150 does not block light from the LEDs 33.

By providing the fingerprint sensor 50 in the backlight module 30, the display function of the display panel 10 is not affected. By forming the fingerprint sensing area 103 in the display area 101, there is no need to use or set a wide non-display area for the fingerprint sensor 50.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A liquid crystal display (LCD) device defining a display area, comprising:
    a backlight module for providing light, the backlight module comprising a reflective sheet and a diffusion sheet stacked on the reflective sheet;
    an LCD panel stacked on the backlight module; and
    a fingerprint sensor in the backlight module;
    wherein the fingerprint sensor is positioned in the display area and defines a fingerprint sensing area in the display area;
    wherein the backlight module further comprises a plurality of light emitting diodes between the diffusion sheet and the reflective sheet; the backlight module defines a receiving hole; the fingerprint sensor is in the receiving hole; the receiving hole extends through the reflective sheet;
    wherein the fingerprint sensor is electrically coupled to a flexible circuit board; the flexible circuit board bends and extends along the reflective sheet; the flexible circuit board is attached on a side of the reflective sheet away from the diffusion sheet.

2. The LCD device of claim 1, wherein no light emitting diode is received in the receiving hole.

3. The LCD device of claim 2, wherein a diffusion film and a prism sheet are positioned on a side of the diffusion sheet away from the plurality of light emitting diodes; the diffusion film is adjacent to the diffusion sheet.

4. The LCD device of claim 1, wherein the backlight module further comprises a light guide plate between the diffusion sheet and the reflective sheet.

5. The LCD device of claim 1, wherein the backlight module further comprises a plurality of light emitting diodes between the diffusion sheet and the reflective sheet; the fingerprint sensor is positioned between the plurality of light emitting diodes and the diffusion sheet; the fingerprint sensor has a degree of transparency such that the light from the backlight module reaches the LCD panel.

6. The LCD device of claim 4, wherein a size of the fingerprint sensing area is same as a size of the display area.

7. The LCD device of claim 4, wherein a size of the fingerprint sensing area is half of a size of the display area.

* * * * *